United States Patent [19]

Urano et al.

[11] 4,371,808
[45] Feb. 1, 1983

[54] ONE-GUN TWO-BEAM CATHODE RAY TUBE

[75] Inventors: Tadao Urano, Hachioji; Isamu Kaneko, Sagamihara, both of Japan

[73] Assignee: Iwatsu Electric Co., Ltd., Tokyo, Japan

[21] Appl. No.: 209,484

[22] Filed: Nov. 24, 1980

[30] Foreign Application Priority Data

Dec. 7, 1979 [JP] Japan .................. 54-159008

[51] Int. Cl.³ ............................................ H01J 29/50
[52] U.S. Cl. .................................. 313/411; 313/426; 313/432; 313/460
[58] Field of Search ............. 313/411, 414, 426, 432, 313/429, 460; 315/13 R

[56] References Cited

U.S. PATENT DOCUMENTS

| | | | |
|---|---|---|---|
| 3,497,744 | 2/1970 | Himmelbauer et al. | 313/432 |
| 3,639,796 | 2/1972 | Fuse | 313/411 |
| 3,792,303 | 2/1974 | Albertin et al. | 313/429 |
| 3,819,984 | 6/1974 | Hawken | |
| 3,949,262 | 4/1976 | Ohkoshi et al. | 313/460 |
| 4,137,479 | 1/1979 | Janko | 313/432 |
| 4,302,704 | 11/1981 | Saito | 313/429 |

Primary Examiner—Bruce C. Anderson
Attorney, Agent, or Firm—Woodcock, Washburn, Kurtz, Mackiewicz & Norris

[57] ABSTRACT

The electron beam emanated by a single electron gun falls, after traversing two successive quadrupolar electron lenses, on a beam separator electrode having a pair of vertically spaced apertures formed therethrough for permitting the passage of fractions of the incident beam as two separate beams for dual image display. Subsequently deflected vertically by respective pairs of vertical deflection plates, the two display beams follow their trajectories to a target screen through a focus corrector device, a third quadrupolar electron lens, a pair of horizontal deflection plates, and a dome-shaped scan expansion mesh. Were it not for the focus corrector device, the spots of the display beams on the screen would differ in size according to whether they were deflected upwardly or downwardly by the vertical deflection plate pairs disposed respectively above and below the tube axis. Comprising four plates arranged in boxlike configuration with insulating gaps therebetween, the focus corrector device functions to compensate for spot size variations in the vertical direction.

5 Claims, 12 Drawing Figures

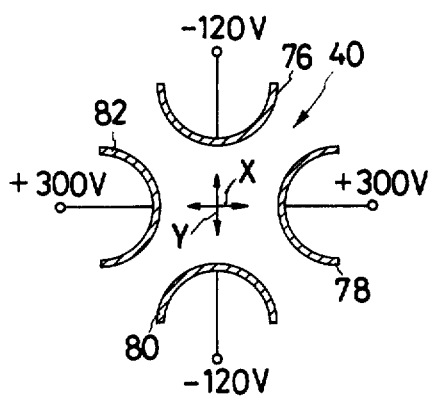
FIG.5
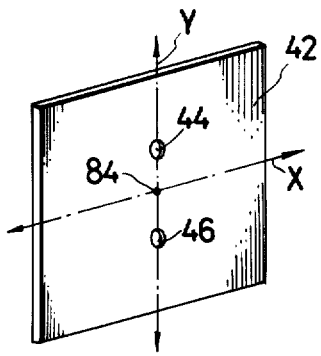
FIG.7
FIG.6
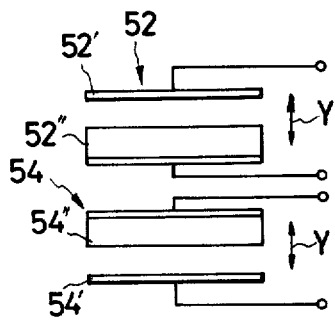
FIG.8
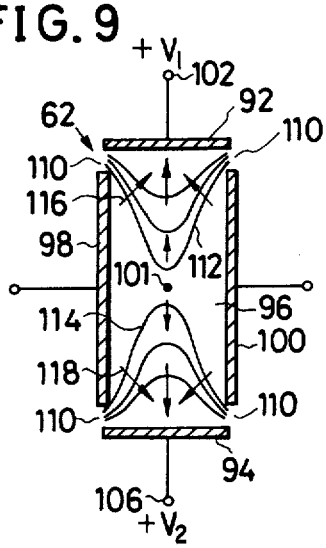
FIG.9
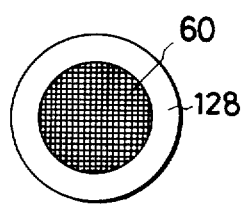
FIG.12
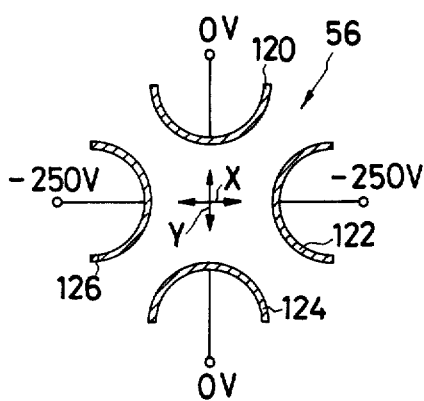
FIG.10
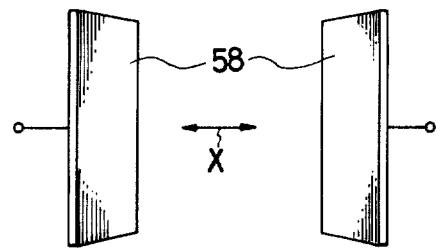
FIG.11

ONE-GUN TWO-BEAM CATHODE RAY TUBE

BACKGROUND OF THE INVENTION

Our invention relates to cathode ray tubes (CRTs) in general and, in particular, to a CRT of the type wherein two separate electron beams are derived from the beam emanated by a single electron gun for dual image display on a target screen. Our invention is directed more particularly to such a one-gun two-beam CRT having improved beam spot uniformity within a region of concern on the target screen.

U.S. Pat. No. 3,819,984 to Hawken, for example, discloses a dual gun CRT having a pair of electron guns together with a pair of deflection systems for individually deflecting the electron beams emitted by the guns, thereby providing dual light images such as signal waveforms on one and the same fluorescent screen. Although of immense utility for some purposes, this known CRT is objectionable because of its large bulk as an inevitable result of the use of two electron guns.

We have applied for a Japanese patent (laid open to public inspection as No. 53-17057) a one-gun two-beam CRT (substantially identical with the one shown in FIG. 1 of the drawings attached hereto) capable of dual image display from a single electron gun. We have later found, however, that our prior proposed one-gun two-beam CRT has some drawbacks. The first is that different focusing voltages act on the two beams depending upon whether they are deflected upwardly or downwardly. If each beam is properly focused on the upper part of the screen, it will fall out of focus on the lower part of the screen, and vice versa. We will discuss the reasons for this later on.

Another drawback of the prior one-gun two-beam CRT is that the two beams tend to focus differently on the screen unless the electron gun is assembled to a required degree of precision with which it is intended to operate. The known CRT has no means for compensating for such different focusing characteristics and so could not be manufactured in an easy, economical way.

SUMMARY OF THE INVENTION

We seek to improve our earlier proposed one-gun two-beam CRT in such a way that the two beams will be sharply focused in all the effective display area on the screen. We also seek to eliminate the difference between the focusing characteristics of the two beams that may arise from the poor assemblage of the electron gun.

The improved CRT according to our invention comprises a single electron gun for emitting an electron beam directed toward a target screen. After passing first and second quadrupolar electron lenses, the beam reaches beam separator means defining a pair of apertures equidistantly spaced from, and aligned in a first (e.g., vertical) direction with, the geometrical center of the cross section of the incident beam. Two separate fractions of the incident beam pass through the apertures to provide two display beams of smaller cross sectional size. Mounted downstream of the beam separator means and spaced from each other in the first direction, two pairs of deflection plates deflect the respective display beams in the first direction. The two display beams subsequently pass a focus corrector device, a third quadrupolar electron lens, and another pair of deflection plates which deflects the display beams in a second (e.g., horizontal) direction perpendicular to the first direction, and then bombard the screen.

The focus corrector device comprises first and second opposed pairs of electrodes which are arranged in generally boxlike configurations with insulating gaps therebetween. The first opposed pair of electrodes are spaced in the first direction and so placed that the two display beams travel the opposite sides of the midpoint therebetween, whereas the second opposed pair of electrodes are spaced in the second direction to an extent necessary for the passage of each display beam. The first pair of electrodes are to be set at a potential higher than that of the second pair, so that the closer the trajectories of the display beams are to the respective electrodes of the first pair, the more they are diverged in the first direction.

In a preferred embodiment the first recited two pairs of deflection plates deflect the respective display beams vertically and are themselves disposed respectively above and below the tube axis. When deflected upwardly by the upper one of these vertical deflection plate pairs, the corresponding display beam traverses the upper end portion of the space within the focus corrector device and thus receives its intense quadrupolar lens action. The same display beam hardly receives the lens action of the focus corrector device when deflected downwardly by the upper vertical deflection plate pair, since then the beam passes the vicinity of the midpoint between the first (vertically spaced) pair of focus corrector electrodes.

The other display beam, when deflected downwardly by the lower vertical deflection plate pair, traverses the lower end portion of the space within the focus corrector device and so receives its intense quadrupolar lens action. The focus corrector device hardly affects this display beam when same is deflected upwardly, since then the beam passes the vicinity of the midpoint between the first pair of focus corrector electrodes.

Thus, even though the third quadrupolar electron lens variously affects the two display beams depending upon the angles of their trajectories in a vertical plane, the focus corrector device compensates for such variable actions of the third electron lens. With the electrodes of the focus corrector device set at appropriate potentials, therefore, the two display beams will focus correctly in all the effective display area on the screen.

The above and other objects, features and advantages of our invention and the manner of attaining them will become more apparent, and the invention itself will best be understood, from the following detailed description taken in conjunction with the attached drawings.

BRIEF DESCRIPTION OF THE DRAWINGS

FIG. 5 is an enlarged sectional view, taken along the line 5—5 of FIG. 2, of the second quadrupolar electron lens in the CRT;

FIG. 6 is a diagram explanatory of the way in which the electron beam emitted by the single electron gun in the CRT of FIG. 2 is separated into two display beams by the beam separator electrode;

FIG. 7 is an enlarged perspective view of the beam separator electrode in the CRT of FIG. 2;

FIG. 8 is an elevational view of the two pairs of vertical deflection plates as seen from the screen side in the CRT of FIG. 2;

FIG. 9 is an enlarged sectional view, taken along the line 9—9 of FIG. 2, of the focus corrector device in the CRT;

FIG. 10 is an enlarged sectional view, taken along the line 10—10 of FIG. 2, of the third quadrupolar electron lens in the CRT;

FIG. 11 is an enlarged elevational view of the pair of horizontal deflection plates as seen from the screen side in the CRT of FIG. 2; and FIG. 12 is an elevational view of the dome-shaped scan expansion mesh as seen from the screen side in the CRT of FIG. 2.

DETAILED DESCRIPTION

Figure 1:
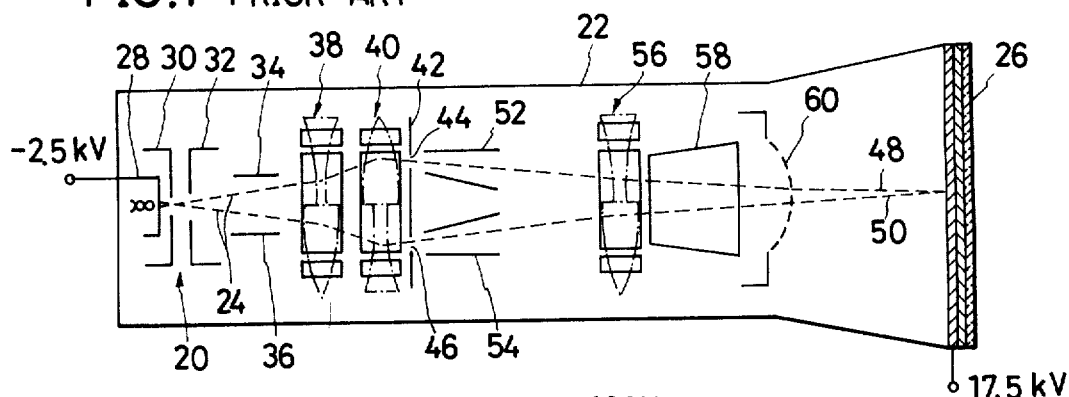
FIG. 1 is a schematic, longitudinal sectional view of the prior art one-gun two-beam CRT bearing particular pertinence to our present invention.

We consider it essential that our earlier one-gun two-beam CRT be described in some more detail with reference to its illustration in FIG. 1, the better to make clear the features and advantages of our present invention. The CRT of FIG. 1 is identical with the one we have applied for a Japanese patent, except that in the latter, the electron gun itself emits two split beams. The illustrated prior art CRT includes a single electron gun 20 mounted within a substantially tubular, evacuated envelope 22, in the vicinity of one end thereof, for emanating an electron beam 24 directed toward a target screen 26 at the other end of the envelope. The electron gun 20 comprises a cathode 28, a first grid electrode 30 generally known as the control grid, and a second grid electrode 32 generally known as the accelerating electrode.

Passing a pair of brightness control electrodes 34 and 36, the electron beam 24 enters a first electrostatic quadrupolar electron lens 38 and then a second similar lens 40, thereby to be diverged and converged in a manner explained presently. Disposed immediately downstream of the second electron lens 40 is a beam separator electrode 42 in the form of a plate having two relatively small apertures 44 and 46 formed therethrough. This beam separator electrode functions to derive from the incident beam 24 two individual display beams 48 and 50 of smaller cross sectional size, which are shown following their trajectories when not deflected.

The two display beams 48 and 50 undergo deflections in a vertical direction as they subsequently pass respective pairs of vertical deflection plates 52 and 54. A third electrostatic quadrupolar electron lens 56 amplifies or magnifies the deflections of the two display beams. Then, after being deflected in a horizontal direction by a single pair of horizontal deflection plates 58, the display beams 48 and 50 traverse a dome-shaped scan expansion mesh 60 and bombard the target screen 26.

Should the electron gun 20 be not assembled and mounted with a required degree of precision, a difference may exist in brightness between the displays created by the two display beams 48 and 50. The pair of brightness control electrodes 34 and 36 functions to eliminate such a difference in brightness, through adjustment of voltages applied thereto.

As indicated by the dot-and-dash lines in FIG. 1 by way of example, the first 38 and third 56 quadrupolar electron lenses provide a convergent action in a horizontal direction and a divergent action in a vertical direction. The second quadrupolar electron lens 40, on the other hand, produces a divergent action in the horizontal direction and a convergent action in the vertical direction.

As has been pointed out, in the one-gun two-beam CRT of this known design, the spots of the two display beams very considerably in size between the upper and lower parts of the screen 26. We have found that this is because the first 52 and second 54 pairs of vertical deflection plates lie on the opposite sides of, and away from, the axis of the envelope 22 in the vertical direction. Let it be assumed that the first vertical deflection plate pair 52 deflects the display beam 48 toward the upper part of the target screen 26. The display beam 48 will then pass the third quadrupolar lens 56 more or less parallel to the tube axis. When deflected toward the lower part of the screen, however, the display beam 48 will pass the third quadrupolar lens 56 at an angle to the tube axis. Thus the display beam travels a greater distance through the third quadrupolar lens, and so is thereby acted upon to a greater extent, when deflected downwardly than when deflected upwardly, resulting in the noted difference in beam spot size between the upper and lower parts of the screen.

The same holds true with the second display beam 50. When deflected toward the lower part of the screen by the second vertical deflection plate pair 54, the display beam 50 will travel through the third quadrupolar lens 56 approximately parallel to the tube axis. When deflected toward the upper part of the screen, the display beam will traverse the third quadrupolar lens at an angle to the tube axis. Thus the display beam travels a greater distance through the third quadrupolar lens, and so is thereby affected to a greater extent, when deflected upwardly than when deflected downwardly.

Figure 2:
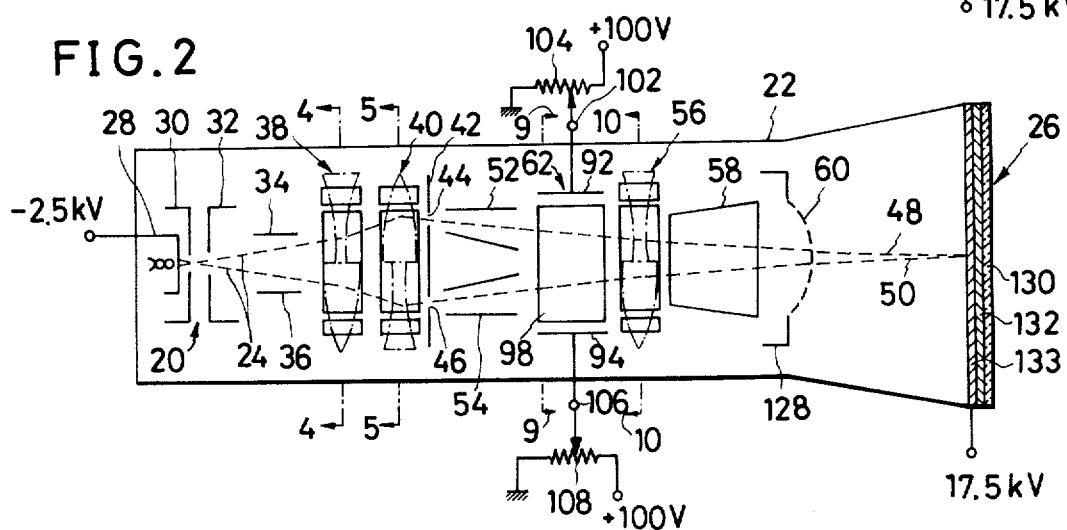
FIG. 2 is a view similar to FIG. 1 but showing the improved CRT of our present invention.

We will now describe our present invention as embodied in the CRT of FIG. 2, which totally overcomes the above and other problems of the prior art. In FIGS. 1 and 2, like reference numerals denote like parts of the prior art and inventive CRTs. It will be noted that the inventive CRT is analogous in general organization with the prior art except that the former has a focus corrector device 62 interposed between the two vertical deflection plate pairs 52 and 54 and the third quadrupolar electron lens 56.

The electron gun 20 comprising the cathode 28, control grid 30 and accelerating electrode 32 is of familiar make, so that no more detailed description will be necessary. Suffice it to say that the cathode 28 operates at $-2500$ volts (V), the control grid 30 at $-2500$ to $-2570$ V, and the accelerating electrode 32 at ground potential, in this particular embodiment.

Figure 3:
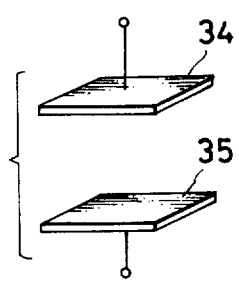
FIG. 3 is an enlarged perspective view of the pair of brightness control electrodes in the CRT of FIG. 2.

As shown in detail in FIG. 3, the pair of brightness control electrodes 34 and 36 can take the form of rectangular plates spaced vertically and held opposite to each other. Emitted toward the target screen 26, the electron beam 24 traverses the space between these brightness control electrodes and undergoes vertical deflection to an extent determined by their relative potentials. The brightness control electrodes 34 and 36 receive potentials variably adjusted between, for example, $-50$ and $+50$ V from one or two potentiometers, not shown.

The pair of brightness control electrodes 34 and 36 need not deflect the beam 24, of course, if the two display beams 48 and 50 subsequently derived therefrom offer no difference in brightness. Such being the usual precision with which the electron gun 20 is assembled, however, the geometrical center of the spot of the beam 24 on the beam separator electrode 42 does not exactly coincide with the midpoint between the pair of apertures 44 and 46 therein, resulting in the difference in brightness between the displays made by the display beams 48 and 50. The brightness control electrodes 34 and 36, with their relative potentials properly adjusted, make it possible to derive the display beams 48 and 50 of the same physical characteristics from symmetrical cross-sectional positions of the beam 24 and so to cause the display beams to create displays of equal brightness.

Figure 4:
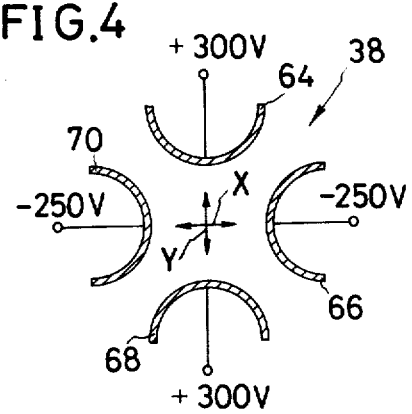
FIG. 4 is an enlarged sectional view, taken along the line 4—4 of FIG. 2, of the first quandrupolar electron lens in the CRT.

FIG. 4 illustrates the organization, and explains the operation, of the first quadrupolar electron lens 38 disposed next to the brightness control electrode pair. The electron lens is composed of four semicylindrical electrodes 64, 66, 68 and 70. The first opposed pair of electrodes 64 and 68 are maintained at a positive potential of, say, 300 V, whereas the second opposed pair of electrodes 66 and 70 are maintained at a negative potential of, say, −250 V. Polarized in this manner, the electron lens 38 diverges the beam 24 in a first or vertical direction Y and converges the beam in a second or horizontal direction X.

As shown in FIG. 5, the second quadrupolar electron lens 40 mounted downstream of the first 38 is of like configuration, comprising four semicylindrical electrodes 76, 78, 80 and 82. The polarization of these electrodes differs, however, from that of the electrodes of the first electron lens 38. The first opposed pair of electrodes 76 and 80 has a negative potential of, say, −120 V, and the second opposed pair of electrodes 78 and 80 has a positive potential of, say, 300 V. With such polarization the second electron lens 40 provides a convergent action in the vertical direction Y and a divergent action in the horizontal direction X.

On traversing the first 38 and second 40 electron lenses the beam 24 gains an elliptical cross-sectional shape such as shown in FIG. 6, and reaches the beam separator electrode 42 in that state. Although FIG. 2 depicts only those trajectories of the beam 24 which correspond to the two display beams 48 and 50 of smaller cross-sectional size extracted therefrom, it is understood that the beam 24 is of sufficient cross sectional size to encompass, and project beyond, these trajectories. The beam separator electrode 42 intercepts most of the electrons in the beam 24 and allows only its fractions to pass through its apertures 44 and 46 as the slender display beams 48 and 50.

FIG. 7 illustrates the beam separator electrode 42 in perspective. It takes the form of a rectangular plate of metal having the two circular apertures 44 and 46 formed therethrough. These apertures 44 and 46 lie in symmetrical position with respect to the point 84 on the electrode 42 that coincides with the geometrical center 86, FIG. 6, of the spot of the beam 24 correctly falling on the electrode 42. The apertures 44 and 46 and the point 84 are in alignment in the vertical direction Y. The distance between the apertures 44 and 46 is appropriately less than the vertical dimension of the beam spot on the electrode 42. Thus, as will be seen also from FIG. 6, the upper aperture 44 permits a fraction 88 of the beam 24 to pass therethrough to provide the first display beam 48. The lower aperture 46 allows another fraction 90 of the beam 24 to pass therethrough to provide the second display beam 50.

FIG. 8 shows the two pairs of vertical deflection plates 52 and 54, as viewed from the side of the target screen 26, which are placed downstream of the beam separator electrode 42. The first pair of vertical deflection plates 52 lie above the axis of the envelope 22 and along the path of the first display beam 48 from the beam separator electrode 42 toward the target screen 26. The upper one 52' of the first vertical deflection plate pair 52 is disposed horizontally, parallel to the tube axis. The lower one 52", on the other hand, is oriented at an angle to the tube axis, slanting downwardly as it extends toward the screen.

The second pair of vertical deflection plates 54 lie below the tube axis and along the path of the second display beam 50 from the beam separator electrode 42 toward the screen 26. The lower one 54' of the second vertical deflection plate pair 54 is oriented horizontally, whereas the upper one 54" inclines upwardly as it extends toward the screen 26.

It is understood that the two pairs of vertical deflection plates 52 and 54 are connected to their own vertical deflection control circuits, not shown. These circuits cause the plate pairs 52 and 54 to independently control the vertical deflections of the two display beams 48 and 50.

Next to be referred to is the focus corrector device 62, shown in an enlarged cross section in FIG. 9, constituting a feature of our present invention. Generally of boxlike configuration, the focus corrector device 62 comprises a first pair of focus corrector electrodes 92 and 94 each oriented horizontally and opposed to each other with a space 96 therebetween, and a second pair of focus corrector (or side shield) electrodes 98 and 100 each disposed vertically and opposed to each other across the space 96. All these electrodes 92, 94, 98 and 100 can take the form of metal plates. The display beams 48 and 50 from the vertical deflection plate pairs 52 and 54 traverse the space 96, passing the upper and lower sides, respectively, of the midpoint 101 between the first opposed pair of focus corrector electrodes 92 and 94.

A reference back to FIG. 2 will reveal that the upper one 92 of the first focus corrector electrode pair is connected via an internal lead terminal 102 to a variable voltage source such as a potentiometer 104. The lower one 94 of the first focus corrector electrode pair is connected via an external lead terminal 106 to another variable voltage source such as a potentiometer 108.

With reference directed again to FIG. 9 the spacing between the first pair of focus corrector electrodes 92 and 94 is greater than the distance required for the passage therethrough of the two display beams 48 and 50 that have been deflected to the maximum effective degrees in the vertical direction by the vertical deflection plate pairs 52 and 54. Further the spacing between these focus corrector electrodes 92 and 94 must be sufficiently great to allow these electrodes to independently effect focus controls of the display beams 48 and 50.

The spacing between the second pair of focus corrector electrodes 98 and 100 is preferably several times greater than the diameter of each display beam passing through the space therebetween. Each of these electrodes 98 and 100, moreover, has a vertical dimension sufficient to cover the trajectories of the display beams 48 and 50 that have undergone vertical deflections to the predetermined limits.

With the four electrodes of the focus corrector device 62 arranged as above, the spacing between the first pair of electrodes 92 and 94 is significantly more than the spacing between the second pair of electrodes 98 and 100. The four focus corrector electrodes 92, 94, 98 and 100 bound the rectangular space 96 therein, but with gaps 110 physically separating and electrically insulating the electrodes from one another.

In the operation of the focus corrector device 62 the second pair of electrodes 98 and 100 may be set at a potential equal to the potential of the two pairs of vertical deflection plates 52 and 54, FIG. 8, at the time when they do not deflect the display beams 48 and 50. Thus the second pair of focus corrector electrodes 98 and 100 will have a potential of 0 V if the nondeflecting potential of the vertical deflection plate pairs 52 and 54 is 0 V, and a potential of 40 V if the nondeflecting potential of the vertical deflection plate pairs is 40 V. When the vertical deflection plate pairs are active, the second pair of focus corrector electrodes may have a potential intermediate the potential of the vertical deflection plates 52' and 54' and the potential of the vertical deflection plates 52" and 54".

The first pair of focus corrector electrodes 92 and 94, on the other hand, may be set at approximately equal positive potentials V1 and V2 by the potentiometers 104 and 108, respectively. FIG. 9 shows equipotential lines 112 and 114 thus created in the space 96 within the focus corrector device 62, as well as electric fields acting normal to the equipotential lines. The arrows 116 and 118 indicate the directions of the electric fields, and the lengths of these arrows represent the intensities of the electric fields in the locations of the arrows.

If the potentials V1 and V2 of the first pair of focus corrector electrodes 92 and 94 are set exactly equal to each other by the potentiometers 104 and 108, the electric fields generated at the upper and lower halves of the space 96 will be symmetrical with respect to the midpoint 101. It will further be seen that the focus correcting field intensity is practically zero in the vicinity of the midpoint 101 and gradually increases toward the first pair of focus corrector electrodes 92 and 94.

As will be noted by referring back to FIG. 2, the focus corrector device 62 lies close to the two pairs of vertical deflection plates 52 and 54. Thus the trajectories of the first display beam 48 from the first vertical deflection plate pair 52 extend through the upper half (above the midpoint 101) of the space 96 within the focus corrector device 62, whereas the trajectories of the second display beam 50 from the second vertical deflection plate pair 54 extend through the lower half of the space 96.

Let us now consider the first display beam 48 which is variously deflected in the vertical direction by the first vertical deflection plate pair 52 before traveling through the focus corrector device 62, in order to clarify the functions of this device. When deflected upwardly, the display beam 48 will trace a trajectory close to the top focus corrector electrode 92. This electrode will then act to converge the display beam 48 in the horizontal direction and to diverge the display beam in the vertical direction, slightly shifting its path upwardly. When deflected downwardly, on the other hand, the display beam 48 will follow a path in the vicinity of the midpoint or center 101 of the space 96 within the focus corrector device 62. The top focus corrector electrode 92, and of course the bottom focus corrector electrode 94, will then hardly act on the display beam 48. Thus, when the display beam 48 is deflected more or less upwardly by the first vertical deflection plate pair 52, the focus corrector device 62 with its internal electric field functions as a quadrupolar electron lens, providing a divergent action in the vertical direction and a convergent action in the horizontal direction.

As has been discussed in connection with the prior art CRT of FIG. 1, the first display beam 48 when deflected upwardly travels a minimum distance through the third electrostatic quadrupolar electron lens 56 disposed in the succeeding stage of the focus corrector device 62 and so is thereby acted upon to the minimum degree. The more the display beam 48 is deflected downwardly, the greater distance it must travel through the third quadrupolar lens 56, and the more, therefore, it is acted upon by the lens. Conversely, in the preceding focus corrector device 62, the display beam 48 receives a stronger lens action when deflected upwardly than when deflected downwardly. It is thus seen that the focus corrector device 62 is well calculated to compensate for the variable lens action of the third quadrupolar lens 56, making it possible for the display beam 48 to focus with a uniform spot size on all effective parts of the screen 26.

The same holds true with the second display beam 50. When deflected downwardly by the second vertical deflection plate pair 54, the display beam 50 will follow a trajectory close to the bottom electrode 94 of the focus corrector device 62 thereby to be strongly acted upon. On upward deflection, on the other hand, the display beam 50 will pass the vicinity of the geometrical center 101 of the space 96 within the focus corrector device 62. Both electrodes 92 and 94 will then hardly affect the display beam. Consequently the focus corrector device 62, in combination with the third quadrupolar lens 56, enables the display beam 50 to focus with a constant spot size on all effective parts of the screen 26.

In order for the focus corrector device 62 to function in the intended manner set forth in the foregoing, the potentials of its first opposed pair of electrodes 92 and 94 must be adjusted by the respective potentiometers 104 and 108. Prior to such adjustment of the potentials of the focus corrector electrodes 92 and 94, they may first be set equal to the potential of the second pair of electrodes 98 and 100 to see how the spots of the display beams 48 and 50 on the screen 26 vary in size with their vertical deflection. The spot sizes will change between the upper and lower parts of the screen since then the focus corrector device 62 provides no corrective action. Then, while the display beams 48 and 50 are being deflected vertically, the output voltages of the potentiometers 104 and 108 may be adjusted in such a way that the beam spots on the screen may become constant in size at any point in the vertical direction. The output voltages of the potentiometers, and therefore the potentials of the first pair of focus corrector electrodes 92 and 94, may be fixed at values that offer an unvarying spot size characteristic.

Let it be assumed that the cathode 28 of this CRT has a potential of $-2.5$ kv, that the first pair of focus corrector electrodes 92 and 94 has a spacing of 15 millimeters (mm), and that the second pair of focus corrector electrodes 98 and 100 has a spacing of 5 mm. Also assume that the two separate display beams 48 and 50 have no difference in focusing characteristics accruing from the poor assemblage of the electron gun 20. We have found from experiment that under these conditions, the two display beams focus sharply on all parts of the screen when the potentials V1 and V2 of the first pair of focus corrector electrodes 92 and 94 are each approximately 20 V higher than that of each of the second pair 98 and 100. Thus, for example, the potentials V1 and V2 may be about 20 V if the second pair of focus corrector electrodes are at ground potential, and about 60 V if the second pair have each a potential of 40 V.

It has been stated in connection with the prior art that, should the assemblage of the electron gun be poor, the two display beams tend to have different focusing characteristics. If either of the display beams is focused correctly on the screen, the other will fall out of focus thereon. It is in consideration of this possibility that the first pair of electrodes 92 and 94 of the focus corrector device 62 according to our present invention are coupled to the separate potentiometers 104 and 108. By setting this first pair of electrodes at appropriate different values of the potentials V1 and V2 by means of the potentiometers 104 and 108, the equipotential lines at the upper and lower portions of the space 96 within the focus corrector device 62 will differ correspondingly, making it possible to focus both display beams correctly on the screen. We have also ascertained by experiment that the difference between the potentials V1 and V2 should not exceed 10 V for the best results.

FIG. 10 shows in detail the third electrostatic quadrupolar electron lens 56 lying in the subsequent stage of the focus corrector device 62. Like the two preceding electron lenses 38 and 40, this electron lens 56 also comprises four semicylindrical electrodes 120, 122, 124 and 126. The opposed pair of electrodes 120 and 124 are maintained at, for example, ground potential, whereas the other opposed pair of electrodes 122 and 126 are maintained at a negative potential of, say, −250 V. Consequently the third electron lens 56 diverges the display beams 48 and 50 in the vertical direction Y and converges the display beams in the horizontal direction X.

When deflected toward the lower limit of the screen 26, the first display beam 48 passes approximately the geometrical center of the third electron lens 56 at an angle to the tube axis. When deflected toward the upper limit of the screen, the first display beam traverses the third electron lens substantially parallel to the tube axis. The second display beam 50, on the other hand, passes the third electron lens 56 substantially parallel to the tube axis when deflected toward the lower limit of the screen, and passes approximately the geometrical center of the lens at an angle to the tube axis when deflected toward the upper limit of the screen.

In FIG. 11 is shown, as viewed from the target side, the pair of horizontal deflection plates 58 mounted immediately downstream of the third electron lens 56. The two horizontal deflection plates 58 are disposed symmetrically with respect to the tube axis and, as will be understood from this figure, so as to diverge apart from each other as they extend toward the screen 26. Both of the separated display beams 48 and 50 traverse the space between the horizontal deflection plate pair 58, so that they undergo horizontal deflection under the same conditions.

FIG. 12 is an end view of the dome-shaped scan expansion mesh 60 disposed between the horizontal deflection plate pair 58 and the target screen 26. Anchored to an annular mount 128, the mesh 60 has a hemispherical configuration directed toward the screen 26 to provide divergent lens action for scan expansion. The mesh may be set at ground potential.

Forming the front end of the vacuum envelope 22, the target get screen 26 can be of the familiar make comprising a faceplate 130, a fluorescent layer 132, and a thin conductive coating 134. The conductive coating 134 is set at a potential of say, 17.5 kv. Although the two pairs of vertical deflection plates 52 and 54 independently deflect the display beams 48 and 50 in the vertical direction, only one pair of horizontal deflection plates 58 is provided for horizontally deflecting the two display beams. Thus, on the target screen 26, the display beams 48 and 50 create displays that are synchronized only in the horizontal direction.

The foregoing will have made clear that, in the improved one-gun two-beam CRT of our present invention, the focus corrector device 62 effectively compensates for the different focusing characteristics of the two display beams 48 and 50 in the vertical direction due to the arrangement of the two pairs of vertical deflection plates 52 and 54 on the upper and lower sides of the tube axis. With their focusing characteristics thus corrected, the two display beams provide spots of practically constant size in the complete effective display region of the screen.

An additional feature of our invention resides in the provision of the separate potentiometers 104 and 108 for independent adjustment of the potentials of the first opposed pair of electrodes 92 and 94 in the focus corrector device 62. Such independent control of the potentials of the electrodes 92 and 94 enables the device 62 to remedy the different focusing characteristics of the two display beams arising from the poor assemblage of the electron gun 20. This feature permits shipment to the consumer market of even those products which have heretofore been judged to be defective solely by reason of the different focusing characteristics of the two display beams, thereby materially simplifying and making economical the manufacture of CRTs of this class.

The provision of the two potentiometers 104 and 108 or equivalent devices for the independent potential adjustment of the two focus corrector electrodes 92 and 94 is not, however, an essential feature of our invention. For use with CRTs that will develope no difference between the focusing characteristics of the two display beams, the focus corrector electrodes 92 and 94 may be electrically interconnected, either on the inside or outside of the envelope, and connected to a single potentiometer or the like. Further, if desired or required, a knob or knobs may be provided for the readjustment of the output voltage or voltages of the potentiometer or potentiometers, instead of semipermanently fixing the output voltages as in the illustrated embodiment.

It has been stated that the second opposed pair of focus corrector electrodes 98 and 100 are set at a potential intermediate the beam-deflecting potential of the vertical deflection plates 52' and 54' and the beam-deflecting potential of the vertical deflection plates 52" and 54", or equal to the nondeflecting potential of these plate pairs. This potential setting is by way of example only. The potential of the second focus corrector electrode pair may be slightly higher or lower than the nondeflecting potential of the vertical deflection plate pairs.

We also recognize that our invention finds application to CRTs of other than the illustrated configuration. For example, the dome-shaped scan expansion mesh 60 may be replaced by a planar mesh, or such a mesh may be removed altogether. Further a post deflection acceleration device or additional electron lens or the like may be provided. It is also possible to employ cylindrical or hyperbolic electrodes in place of the semicylindrical electrodes of the three electrostatic quadrupolar electron lenses 38, 40 and 56. Still further our invention is applicable to cathode-ray storage tubes.

All these and other modifications, variations and adaptations are intended in the foregoing disclosure. We do not wish, therefore, our invention to be limited by the extact details of the embodiment disclosed herein but only by the terms of the following claims.

We claim:

1. A one-gun two-beam cathode ray tube comprising:
   (a) an envelope having a target screen;
   (b) an electron gun for producing an electron beam directed toward the target screen;
   (c) a first quadrupolar electron lens disposed along the path of the beam for diverging the beam in a first direction and for converging the beam in a second direction, the first and the second directions being at right angles with each other;
   (d) a second quadrupolar electron lens disposed along the path of the beam from the first electron lens for converging the beam in the first direction and for diverging the beam in the second direction;
   (e) beam separator means disposed across the path of the beam from the second electron lens and defining a pair of apertures equidistantly spaced from, and aligned in the first direction with, the geometrical center of the cross section of the incident beam, whereby two separate fractions of the incident beam are admitted through the apertures to provide first and second display beams of smaller cross sectional size;
   (f) a first pair of deflection plates for deflecting the first display beam from the beam separator means in the first direction;
   (g) a second pair of deflection plates for deflecting the second display beam from the beam separator means in the first direction;
   (h) focus corrector means disposed along the paths of the first and the second display beams from the first and the second pairs of deflection plates, the focus corrector means comprising first and second opposed pairs of electrodes which are arranged in generally boxlike configuration and which are separated from one another, the first opposed pair of electrodes being spaced from each other in the first direction and so positioned that the first and the second display beams pass the opposite sides of the midpoint between the first pair of electrodes, the second opposed pair of electrodes being spaced from each other in the second direction to an extent necessary for the passage of each display beam, the first pair of electrodes being set at a potential higher than the potential of the second pair of electrodes, whereby the first and the second display beams are diverged in the first direction to a greater extent as the display beams pass closer to the respective electrodes of the first pair;
   (i) a third quadrupolar electron lens for diverging the first and the second display beams from the focus corrector means in the first direction and for converging the first and the second display beams in the second direction; and
   (j) a third pair of deflection plates for deflecting the first and the second display beams from the third electron lens in the second direction.

2. The cathode ray tube as set forth in claim 1, further comprising means for independently adjusting the potentials of the first opposed pair of electrodes of the focus corrector means.

3. The cathode ray tube as set forth in claim 1 or 2, wherein the second pair of electrodes of the focus corrector means are set at a potential equal to the nondeflecting potential of the first and the second pairs of deflection plates.

4. The cathode ray tube as set forth in claim 1, further comprising a scan expansion mesh interposed between the third pair of deflection plates and the screen.

5. The cathode ray tube as set forth in claim 1, further comprising a pair of brightness control electrodes interposed between the electron gun and the first quadrupolar electron lens for controlling the relative brightnesses of the displays created by the first and the second display beams.

* * * * *